E. S. JOHNSON.
COUPLING.
APPLICATION FILED FEB. 12, 1916.
1,200,360.
Patented Oct. 3, 1916.
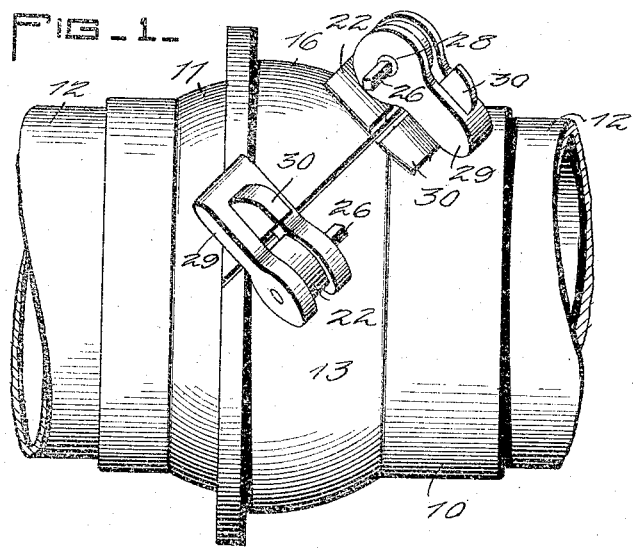
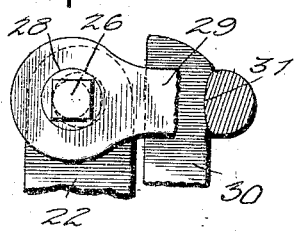
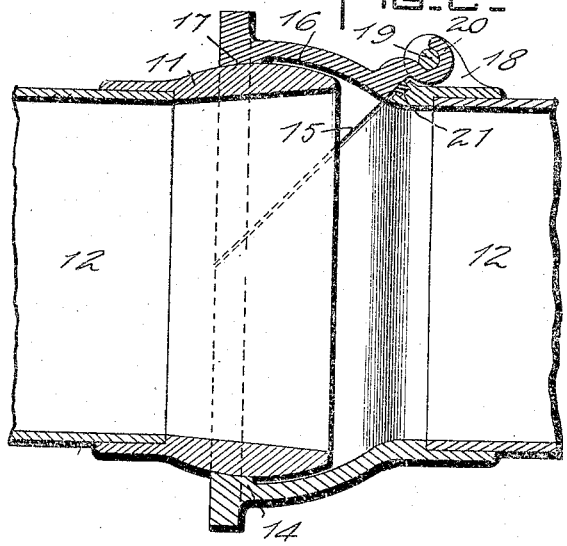
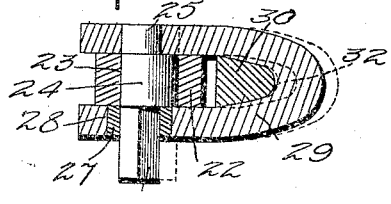
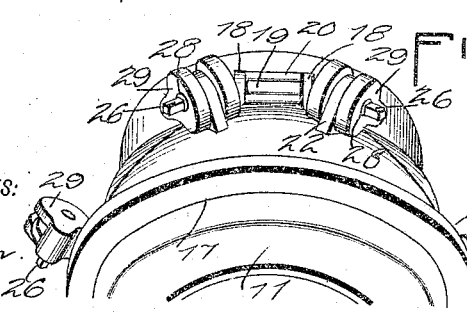
WITNESSES:
INVENTOR
EDWIN S. JOHNSON,
BY
ATTORNEYS

UNITED STATES PATENT OFFICE.

EDWIN SAMUEL JOHNSON, OF TAMPA, FLORIDA, ASSIGNOR TO LOUIS F. TABBERT, OF TAMPA, FLORIDA.

COUPLING.

1,200,360.  Specification of Letters Patent. Patented Oct. 3, 1916.

Application filed February 12, 1916. Serial No. 78,000.

*To all whom it may concern:*

Be it known that I, EDWIN S. JOHNSON, a citizen of the United States, and a resident of Tampa, in the county of Hillsboro and State of Florida, have invented an Improvement in Couplings, of which the following is a specification.

This invention is an improvement in flexible couplings and has particular reference to a pipe coupling of the ball and socket type.

An object of the invention is to provide one of the members of the coupling with an auxiliary section detachably pivoted to the main portion thereof and secured in coupling or operative position through the medium of a novel form of locking device, which is an improvement on Patent No. 1,162,527.

Another and more specific object is the provision of a locking device including a pivoted shackle member secured to either the auxiliary or main portion of a section of the coupling and adapted to engage a fixed element formed on the opposite portion and adjusted into locking engagement with said element by means of an eccentric.

A further object is the provision of a coupling of this nature which is simple in construction, easy to manufacture, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a side elevation of the coupling constructed in accordance with the invention. Fig. 2 is a vertical longitudinal sectional view. Fig. 3 is a fragmentary side elevation of one of the locking devices. Fig. 4 is a longitudinal section therethrough. Fig. 5 is a perspective view of a coupling.

Referring more particularly to the accompanying drawing, in which like reference characters indicate similar parts, the numeral 10 indicates generally the socket member and 11 the ball member of the coupling, the usual provision being made in the outer ends of said members for the reception of suitable pipes 12. The ball member 11 is of the usual construction wherein the inner end is formed from a section of a sphere.

The socket member is also formed from a section of a sphere and comprises a main portion 13 having a flange 14 for engagement with the outer face of the spherical portion of the ball member whereby the sections of the coupling cannot become detached when the same are in operative position. The main portion 13 is reduced or cut away as indicated at 15 on a diagonal plane through the center of the spherical portion of the member. The socket member 10 is completed by an auxiliary section 16 which, in transverse section, forms substantially a segment of a circle and is adapted to coöperate with the main section 13 in forming the remainder of the spherical portion of said socket member. The outer edge of said auxiliary section or portion 16 is flanged as indicated at 17 to engage the outer face of the ball member similarly to the flange 14. The main section 13 of the socket member is provided with oppositely disposed lugs 18 having mounted therein a pintle 19 which receives a hooked extension 20 formed upon the auxiliary section 16 whereby said section is pivoted to the main section 13. The diagonal face of the main section 13 is provided with an insert of packing 21 which extends slightly beyond said edge and is engaged by the contiguous edge of the auxiliary section 16 whereby a tight joint is formed therebetween.

The main and auxiliary sections of the socket member are provided adjacent their meeting edges with pivoted ears 22 each having an opening 23 adjacent its upper end for the reception of the eccentric portion 24 of the stub shaft 25 the ends of which project beyond the sides of said pivot ear, the end 26 of the shaft being squared and having mounted thereon a ring 27 adapted to fit in an opening 28 formed in one end of a shackle or latch member 29, the other end of said shackle member being mounted upon the other extremity of the shaft 25. The squared end 26 of the shaft 25 projects beyond the side of the shackle member whereby a wrench or other implement may be applied thereto in order to rotate said shaft to lock the sections of the coupling together as will be presently described. Directly opposite each of the pivoted ears 22 the other section of the socket member is provided with a locking post or element 30 arranged adjacent the edge of the section and provided in the vertical edge thereof farthest from the edge of said section with a curved cut out portion or depression 31 adapted to receive a similarly curved projection or portion 32 formed upon the inner edge of the shackle member 29 intermediate its ends and where the same is bent or curved. When first assembling the parts the shackle 29 is passed over the upper end of the post 30 and assumes the dotted line position shown in Fig. 4 with the eccentric 24 turned so that the shaft will also be in the dotted line position shown. The shaft 25 is then rotated, as previously described, and the eccentric portion 24 bearing against the walls of the opening 23 will cause the curved portion 32 of the shackle to engage with the recess 31 in the locking post 30 and when the eccentric reaches the position shown in Fig. 4 the parts will be securely locked together thus effectively retaining the main and auxiliary sections 13 and 16 of the socket member in operative position.

What is claimed is:

A coupling comprising a ball member, a socket member associated therewith and including a main section, an auxiliary section pivoted to said main section, a stationary member carried by one of said sections, a locking post secured to the other section opposite said stationary member, a shaft associated with said stationary member and having an eccentric portion mounted therein and of a width equal to or less than the thickness thereof, and a shackle member mounted upon said shaft and engaging the sides of said stationary member, said shackle member being adapted to engage and bind against said locking post when the eccentric portion of said shaft is rotated, said shaft having a squared portion at one extending beyond said shackle member for receiving an implement whereby the shackle is rotated.

EDWIN SAMUEL JOHNSON.

Copies of this patent may be obtained for five cents each, by addressing the "Commissioner of Patents, Washington, D. C."